United States Patent
Cochran

(10) Patent No.: US 6,267,330 B1
(45) Date of Patent: Jul. 31, 2001

(54) LIQUID OXYGEN DOWNCOMER

(75) Inventor: David B. Cochran, Bellevue, WA (US)

(73) Assignee: Kistler Aerospace Corporation, Kirkland, WA (US)

( * ) Notice: Subject to any disclaimer, the term of this patent is extended or adjusted under 35 U.S.C. 154(b) by 0 days.

(21) Appl. No.: 09/260,857

(22) Filed: Mar. 1, 1999

(51) Int. Cl.[7] ................................................. B64G 1/40
(52) U.S. Cl. ............................................................ 244/172
(58) Field of Search ............................. 244/74, 169, 172

(56) References Cited

U.S. PATENT DOCUMENTS

| | | | |
|---|---|---|---|
| 2,816,721 | 12/1957 | Taylor | 244/74 |
| 3,097,480 | 7/1963 | Sohn | 60/35.5 |
| 3,242,811 | * 3/1966 | Swet | 244/172 |
| 3,304,724 | * 2/1967 | Blumrich et al. . | |
| 3,537,477 | 11/1970 | Mahoff | 137/614.03 |
| 3,697,021 | 10/1972 | Howard | 244/1 SB |
| 3,770,303 | * 11/1973 | Hallett . | |
| 4,023,515 | * 5/1977 | Tharaldson . | |
| 4,307,744 | 12/1981 | Marrison | 137/68 R |
| 4,451,017 | 5/1984 | Marshall | 244/172 |
| 4,513,625 | * 4/1985 | Campman et al. . | |
| 4,575,029 | * 3/1986 | Harwood et al. . | |
| 4,687,639 | * 8/1987 | Whiteside . | |
| 4,943,014 | * 7/1990 | Harwood et al. . | |
| 5,129,602 | 7/1992 | Leonard | 244/172 |
| 5,141,181 | * 8/1992 | Leonard . | |
| 5,428,907 | 7/1995 | Haslbeck et al. | 34/588 |
| 5,568,901 | 10/1996 | Stiennon | 244/63 |
| 5,667,167 | 9/1997 | Kistler | 244/110 E |

OTHER PUBLICATIONS

Patrick J. G. Steinnon, "Two Stage Launch Vehicle and Launch Trajectory Method," Aug. 7, 1994, 18 pages.

* cited by examiner

Primary Examiner—Charles T. Jordan
Assistant Examiner—Tien Dinh
(74) Attorney, Agent, or Firm—Christensen O'Connor Johnson Kindness PLLC

(57) ABSTRACT

A feedline for transporting propellant from a tank of a launch vehicle to an engine includes a first conduit coupled to the tank, a second conduit coupled to the engine, and a flexible joint connecting the first conduit to the second conduit. The flexible joint provides fluid communication between the first conduit and the second conduit.

21 Claims, 4 Drawing Sheets

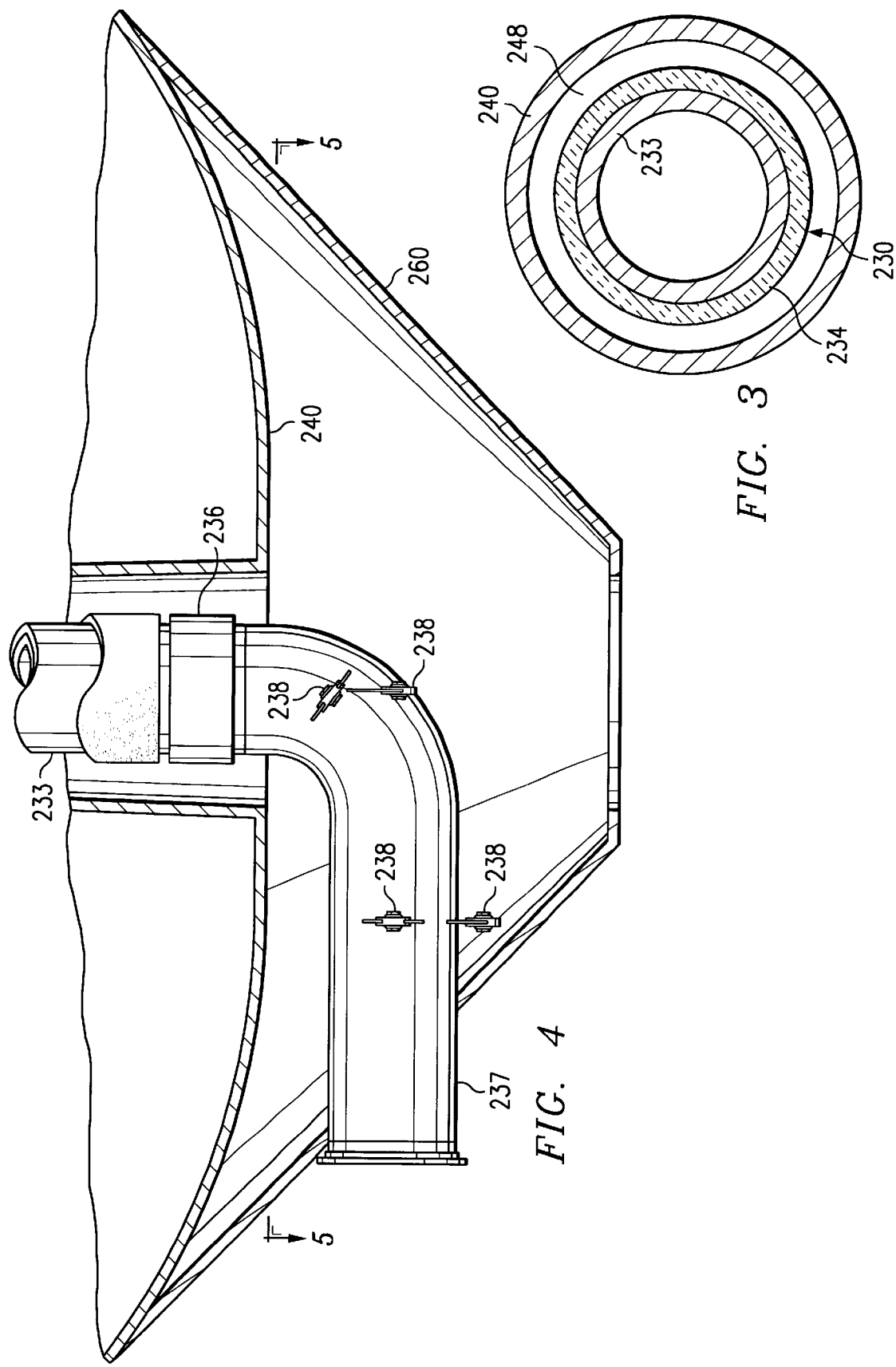

LIQUID OXYGEN DOWNCOMER

TECHNICAL FIELD OF THE INVENTION

This invention relates to space launch vehicles, and more particularly to propulsion systems for space launch vehicles.

BACKGROUND OF THE INVENTION

A space launch vehicle typically has two propellant tanks, one for fuel and one for oxidizer, arranged along its longitudinal axis. This arrangement, however, leaves one tank, the second tank, between the first tank and the engine. Therefore, the feedlines that supply propellant from the first tank to the engine must avoid the second tank.

Routing the feedlines to avoid the second tank produces many problems. For example, traditional external routings produce complicated configurations having elbows where propellant can cavitate and increased length that contributes to excessive propellant boil off. In addition, these configurations typically route the feedlines outside of the vehicle's aerodynamic slipstream. The Saturn V ameliorated some of these problems by forming the feedlines integral with the second tank.

Unfortunately, integrating the feedlines with the second tank presents its own set of problems. When a large temperature differential exists between the propellants, propellant in the second tank that is near the feedlines may degrade in quality, and structural problems may develop at the seals between the feedlines and the second tank due to different thermal expansion characteristics of the feedlines, the seals, and the second tank. Also, the engine and the tanks may experience different loads during launch, producing undesirable stresses on the feedlines.

SUMMARY OF THE INVENTION

In accordance with the present invention, the disadvantages and problems associated with previous feedline designs have been substantially reduced or eliminated. The present invention provides a feedline configuration that reduces stresses on a feedline and reduces the impact of temperature differentials between propellant in the feedline and tanks.

In one embodiment, a feedline for transporting propellant from a tank of a launch vehicle to an engine includes a first conduit coupled to the tank, a second conduit coupled to the engine, and a flexible joint connecting the first conduit to the second conduit. The flexible joint provides fluid communication between the first conduit and the second conduit.

In another embodiment, a launch vehicle includes a first tank, a second tank having a passageway, an engine, and a feedline coupled to the first tank and the engine. The feedline passes through the passageway of the second tank and includes a first conduit coupled to the first tank, a second conduit coupled to the engine, and a flexible joint connecting the first conduit to the second conduit. The flexible joint provides fluid communication between the first conduit and the second conduit.

The present invention includes several important technical features and advantages. First, routing the feedline through a passageway formed by the second tank creates a short, simple feedline configuration, reducing boil off and cavitation. In addition, including a flexible joint in the feedline lessens the loads generated by the engine on certain parts of the feedline. In a particular embodiment, a gimbal may be included in the feedline to correct alignment errors and to further reduce stresses on the feedline. In other embodiments, cryogenic insulation may cover portions of the outside of the feedline to assist in preventing cold propellant in the feedline from degrading the quality of the propellant in the second tank. Other technical advantages will be readily apparent to one skilled in the art from the following figures, description, and claims.

BRIEF DESCRIPTION OF THE DRAWINGS

For a more complete understanding of the present invention and for further features and advantages, reference is now made to the following description taken in conjunction with the accompanying drawings, where like reference numerals represent like parts, in which:

FIG. 3 is a cut-away view along section line 3—3 that illustrates a detailed view of a cross-section of the feedline and the adjacent tank;

FIG. 4 is a view of the thrust structure and a portion of the feedline near the engine with part of the thrust structure cut-away.

DETAILED DESCRIPTION OF THE INVENTION

Figure 1:
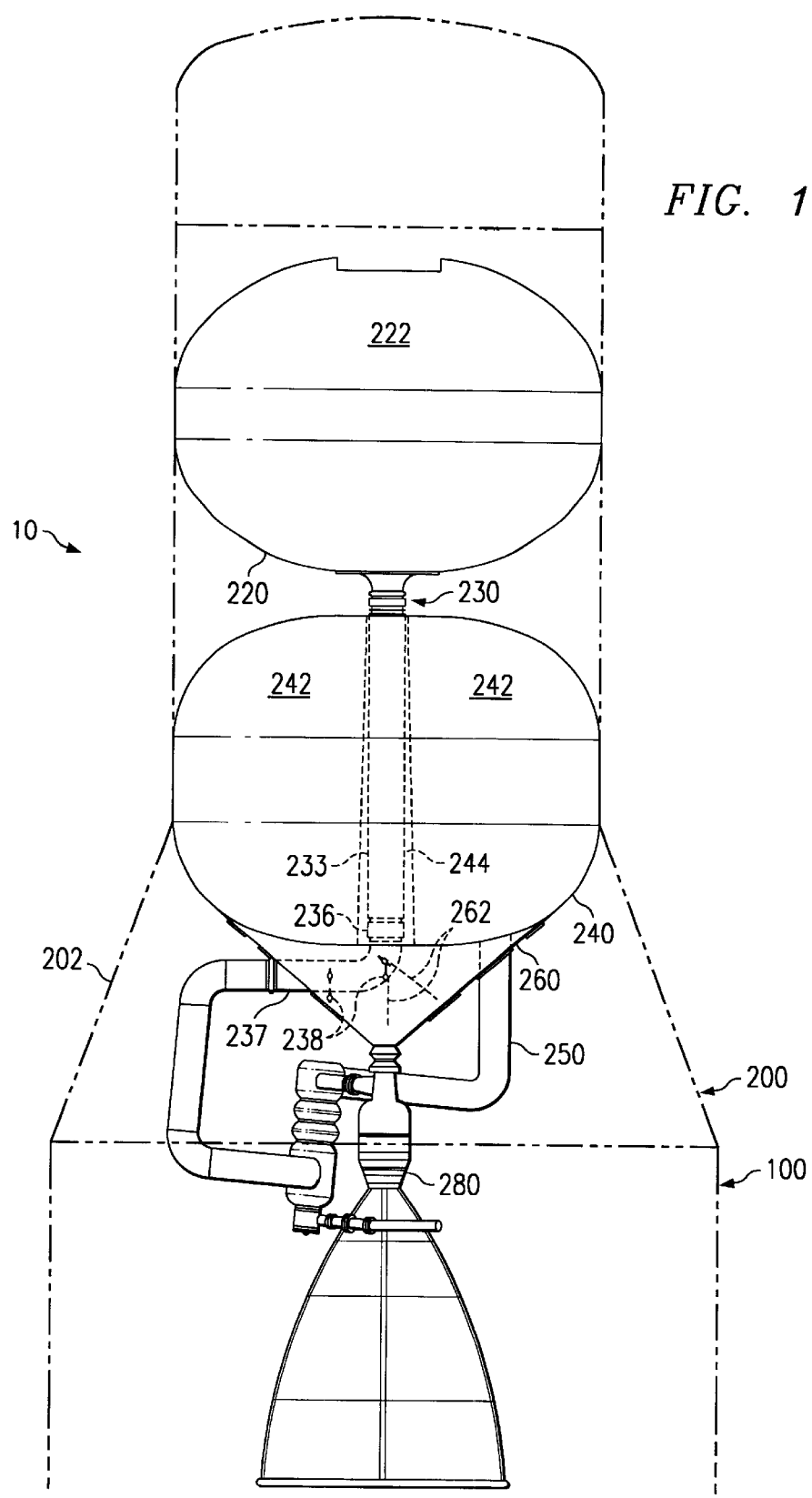
FIG. 1 shows components constructed and assembled in a launch vehicle in accordance with the present invention.

FIG. 1 shows components constructed and assembled in a launch vehicle 10 having a first stage 100 and a second stage 200. In general, second stage 200 includes a feedline 230 to transport a first propellant 222 in a first tank 220 to an engine 280. Note, the feedline configuration discussed may be used as either a fuel or an oxidizer feedline. Further, although the following description describes feedline 230 in a second, or upper, stage of a two-stage launch vehicle 10, it should be appreciated that feedline 230 may be placed in any stage or portion of a single stage or multi-stage launch vehicle.

A shell 202 forms the exterior of and provides structural support for first tank 220 and a second tank 240. Walls of second tank 240 define a passageway 244 adapted to receive a portion of feedline 230. In a particular embodiment, passageway 244 is tapered with its cross-section increasing towards engine 280. Although passageway 244 extends through the substantial center of tank 240, launch vehicle 10 contemplates any number and locations of passageways, such as passageway 244, through or around a tank, such as second tank 240, that can accommodate a feedline, such as feedline 230, coupling a tank, such as first tank 220, to an engine, such as engine 280. A thrust structure 260 attaches to second tank 240 and supports engine 280. Feedline 230 couples first tank 220 to engine 280, and in doing so passes through passageway 244 in second tank 240. A set of struts 262 couple to mounting brackets 238 of feedline 230 in order to couple feedline 230 to thrust structure 260. A feedline 250 couples second tank 240 to engine 280, supplying a second propellant 242 to engine 280.

Feedline 230 includes a first conduit 233, a flexible joint 236, and a second conduit 237. Flexible joint 236 may be a series of slidable sleeves, a bellows, or any other device to provide fluid communication between first conduit 233 and second conduit 237 while allowing axial and/or lateral movement between first conduit 233 and second conduit 237. Allowing movement between first conduit 233 and second conduit 237 reduces the transmission of forces generated by engine 280 to first conduit 233, reduces stresses induced by the relative movement of tank 220 and thrust structure 260, and reduces the forces generated by cryogenic and pressure variations of first propellant 222 in feedline 230.

The following describes a particular embodiment of launch vehicle 10. First tank 220 is composed of a metallic material, such as Aluminum 2219 manufactured by Lockheed Martin Corporation, and second tank 240 is composed of a composite material, such as graphite/epoxy manufactured by Northrop Grumman Corporation. Second tank 240 further possesses a toroidal shape. Also, first propellant 222 in first tank 220 is liquid oxygen (LOX), and second propellant 242 in second tank 240 is RP-1, a kerosene-based fuel. In addition, first conduit 233, flexible joint 236, and second conduit 237 include pieces of a metallic material, such as Inconel 718 manufactured by Stainless Steel Products (SSP), that are welded together and have an internal diameter of approximately 13.000 inches. The thickness of the metallic material is approximately 0.050 inches for first conduit 233, 0.050 and 0.109 inches for second conduit 237, and 0.008 inches for flexible joint 236. Further, flexible joint 236 is a metallic bellows manufactured by Katema.

In operation, engine 280 requires two propellants, for example, an oxidizer and a fuel. First tank 220 stores first propellant 222, and second tank 240 stores second propellant 242. Feedline 230 supplies first propellant 222 from first tank 220 to engine 280, and feedline 250 supplies second propellant 242 from second tank 240 to engine 280. While operating, engine 280 generates loads, which are transferred to thrust structure 260. Due to the large forces generated by engine 280 and the large mass of first propellant 222, thrust structure 260 may move relative to tank 220. Flexible joint 236 reduces the loads transmitted to first conduit 233 of feedline 230 due to thrust structure 260 moving relative to first tank 220.

In other embodiments, a stage of a launch vehicle may contain multiple engines similar to engine 280. In such embodiments, each engine may require its own feedline similar to feedline 230. Thus, passageway 244 may accommodate multiple feedlines similar to feedline 230, or second tank 240 may include multiple passageways similar to passageway 244. Launch vehicle 10 contemplates any number, locations, and sizes of passageways similar to passageway 244 through or around tank 240 that can accommodate feedlines similar to feedline 230 for coupling tank 220 to engines similar to engine 280.

Figure 2:
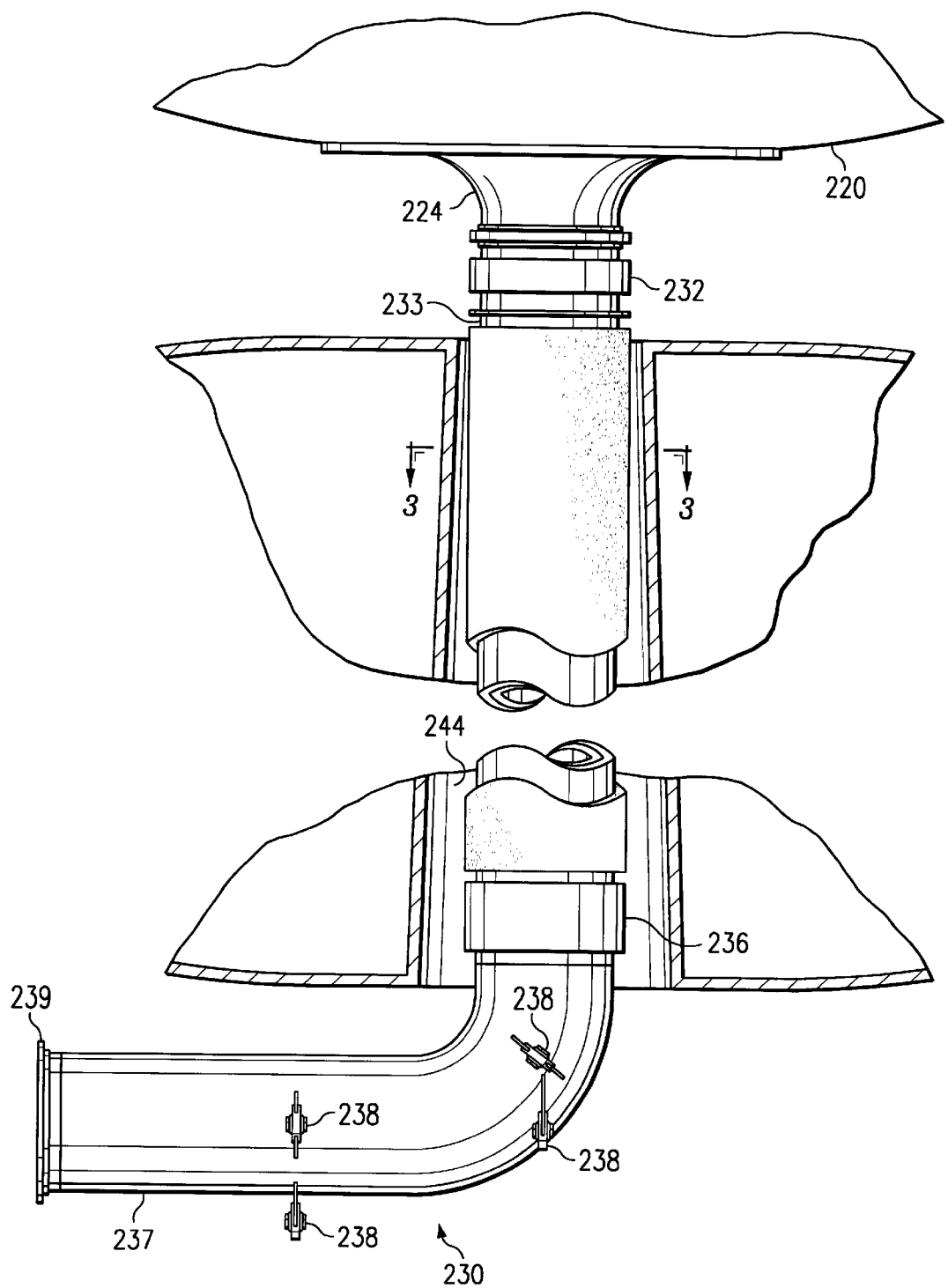
FIG. 2 shows a detailed view of a feedline of the launch vehicle.

FIG. 2 shows a detailed view of feedline 230 and its relation to passageway 244 of second tank 240. First tank 220 couples to one end of first conduit 233 by using a dome outlet fitting 224. The other end of first conduit 233 couples to flexible joint 236. Second conduit 237 also couples to flexible joint 236 and includes a set of mounting brackets 238 coupled to thrust structure 260 (not shown) using struts 262 (not shown). A second flange 239 couples second conduit 237 to the final length of feedline to engine 280 (not shown).

The end of first conduit 233 nearest first tank 220 may optionally include any suitable gimbal, pivot, hinge, or other structure (generally referred to as gimbal 232) that allows first conduit 233 to rotate, pivot, or otherwise move about an axis while still providing fluid communication between first tank 220 and first conduit 233. Gimbal 232 may attach to dome outlet fitting 224 by means of a flange interface. The ability of first conduit 233 to move about gimbal 232 allows for correction of misalignment between tank 220 and second conduit 237 during assembly and assists in compensating for relative movement between tank 220 and thrust structure 260 during flight. In a particular embodiment, gimbal 232 is a universal pivot, such as model 2010632-601 manufactured by Lockheed Martin Corporation, and includes pieces of a metallic material, such as Inconel 718, that are welded together. In this embodiment, the internal diameter of gimbal 232 is approximately 13.000 inches, and the thickness of the metallic material is approximately 0.006 inches.

FIG. 3 is a cut-away view along section line 3—3 that shows a detailed view of a cross-section of feedline 230 and second tank 240. A layer of insulation 234 surrounding first conduit 233 prevents first propellant 222, such as LOX, in first conduit 233 from rapidly removing heat from second tank 240, which may cause second propellant 242, such as RP-1, in second tank 240 to solidify or degrade in quality. Also, FIG. 3 shows an air gap 248 between insulation 234 and second tank 240 that provides further insulation between first conduit 233 and second tank 240.

In a particular embodiment, insulation 234 is a cryogenic insulation, such as SS-1171 manufactured by Isocyanate Products Incorporated (IPI), and is approximately 1.000 inches thick. Also, cryogenic insulation or other forms of insulation may be included on second conduit 237.

FIG. 4 is view of thrust structure 260 and second conduit 237 of feedline 230 with part of thrust structure 260 cutaway. Thrust structure 260 may be generally conical in shape and couples to second tank 240. Thrust structure 260 contains an aperture through which second conduit 237 passes. Second conduit 237 possesses mounting brackets 238 that allow attachment of second conduit 237 to thrust structure 260 by struts 262 (not shown). Thrust structure 260 and second conduit 237, because it is coupled to thrust structure 260 by struts 262, displace both axially and laterally due to forces generated by engine 280 (not shown). Flexible joint 236 mitigates the stresses that may occur in first conduit 233 due to these displacements.

Figure 5:
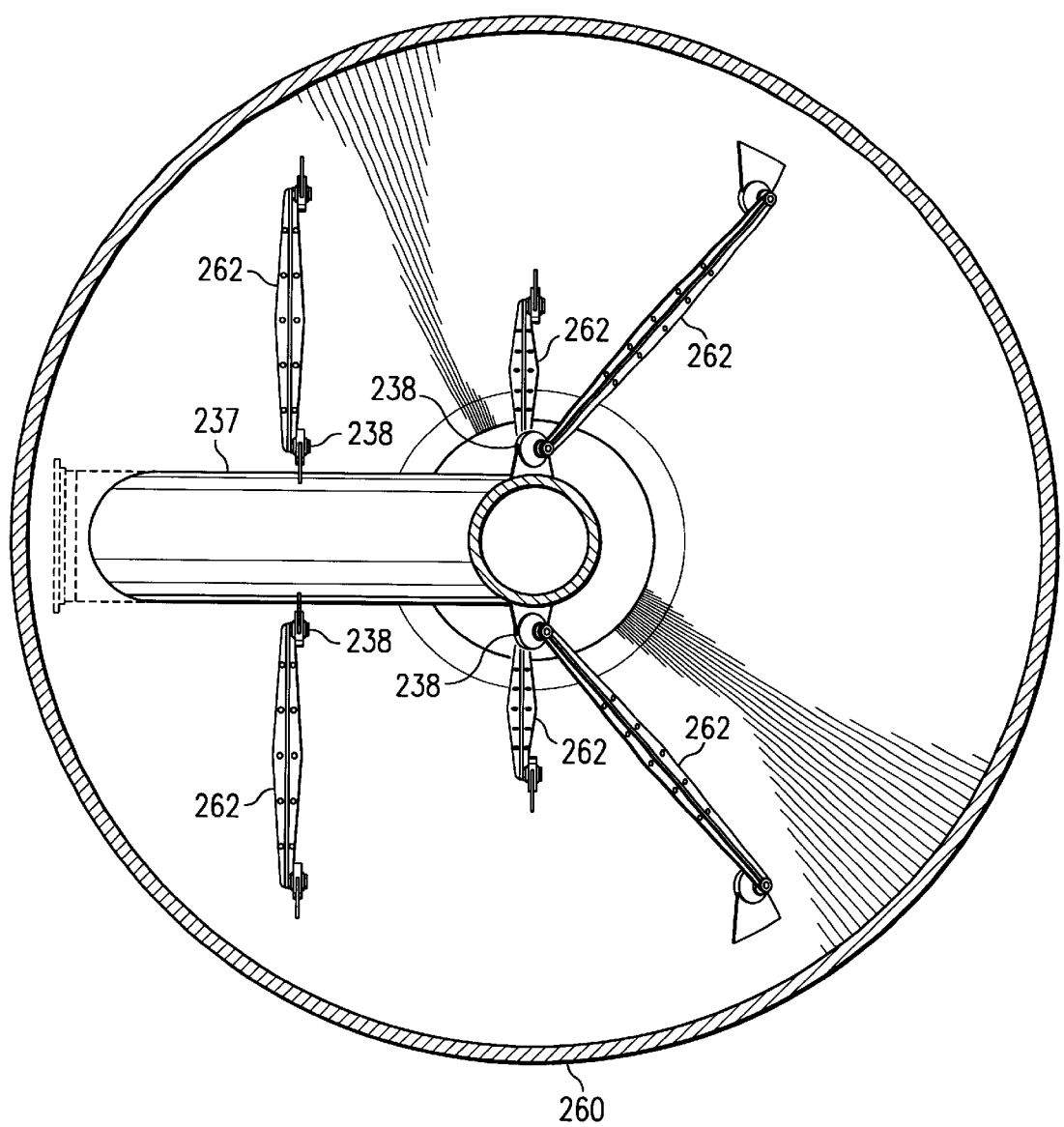
FIG. 5 is a cut-away view along section line 5—5 that illustrates a detailed view of a configuration to support a portion of the feedline near the engine.

FIG. 5 shows a detailed view of a configuration to support second conduit 237. Struts 262 couple to mounting brackets 238 on second conduit 237 and to thrust structure 260. Mounting brackets 238 are placed at various points and orientations on second conduit 237. In a particular embodiment, mounting brackets 238 contain monoball bearings for coupling to struts 262. Also in the embodiment, struts 262 are composed of graphite/epoxy and titanium manufactured by Nova Composites, Incorporated. Note, in other embodiments, thrust structure 260 and/or second conduit 237 may couple to shell 202 or other structural member of launch vehicle 10 directly or through a series of struts.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A launch vehicle, comprising:
   a first tank;
   a second tank having a passageway therethrough, the passageway having a minimum diameter at a first end that increeases to a maximum diameter at a second end;
   an engine; and
   a feedline comprising:

a first conduit coupled to the first tank, the first conduit having a maximum diameter that is less than the passageway minimum diameter, the first conduit passing through the second tank passageway such that there is a gap between the second tank and the first conduit;

a second conduit coupled to the engine; and a flexible joint connecting the first conduit to the second conduit to provide fluid communication between the first conduit and the second conduit.

2. The launch vehicle of claim 1, wherein the feedline comprises metallic material.

3. The launch vehicle of claim 1, wherein the second tank comprises composite material.

4. The launch vehicle of claim 3, wherein the second tank comprises a toroidal shape.

5. The launch vehicle of claim 1, further comprising a thrust structure disposed between the engine and the second tank, wherein the second conduit couples to the thrust structure of the launch vehicle.

6. The launch vehicle of claim 1, wherein the flexible joint reduces the transmission of forces generated by the engine to the first conduit.

7. The launch vehicle of claim 1, wherein the flexible joint comprises a bellows.

8. The launch vehicle of claim 1, wherein the first conduit further comprises a gimbal coupling the first tank and the first conduit.

9. The launch vehicle of claim 1, further comprising a cryogenic insulation covering at least a portion of the first conduit.

10. The launch vehicle of claim 9, wherein the cryogenic insulation and the second tank are spaced apart to form an air gap.

11. A propellant tank system for a liquid-fueled rocket, the tank system comprising:

a tank for liquid oxygen having an upper container portion and a downwardly-extending tubular downcomer, the downcomer having a proximal end that is fluidly connected to the container portion and a distal end that is adapted to be fluidly connected to the rocket; and a fuel tank disposed below the liquid oxygen tank, the fuel tank having at least one vertically oriented passageway having an expanding cross-sectional area and adapted to receive the downcomer therethrough, the fuel tank further comprising a downwardly disposed feedline adapted to fluidly connect the fuel tank to the rocket.

12. The propellant tank system of claim 11 wherein the passageway in the fuel tank is circular in cross-section and has a smaller diameter at the uppermost end of the passageway than at the lowermost end of the passageway.

13. The propellant tank system of claim 12 wherein the passageway extends substantially along an axial centerline of the fuel tank.

14. The propellant tank system of claim 11 further comprising a bellows joint disposed at the distal end of the downcomer and a conduit disposed between the bellows joint and the rocket, thereby fluidly connecting the downcomer to the rocket.

15. The propellant tank system of claim 11 further comprising insulation disposed in the fuel tank passageway between the downcomer and the fuel tank.

16. The propellant tank system of claim 15 wherein the insulation is cryogenic insulation disposed on the downcomer.

17. The propellant tank of claim 16 wherein an air gap is provided between the cryogenic insulation and the fuel tank.

18. A method for supplying oxidizer and fuel to a rocket engine comprising:

providing a tank of oxidizer, the oxidizer tank having a downwardly disposed downcomer, above a tank of fuel, the fuel tank having a passageway therethrough having an expanding cross-sectional area that is adapted to receive the downcomer;

fluidly connecting the distal end of the downcomer from the oxidizer tank to the rocket engine; and fluidly connecting the fuel tank to the rocket engine.

19. The method of claim 18 further comprising the step of providing a flexible bellows joint between the downcomer and the rocket engine.

20. The method of claim 18 wherein the oxidizer is liquid oxygen and the fuel is RP-1.

21. The method of claim 18 further comprising the step of providing a layer of insulation between the downcomer and the fuel tank.

* * * * *

UNITED STATES PATENT AND TRADEMARK OFFICE
CERTIFICATE OF CORRECTION

PATENT NO. : 6,267,330 B1
DATED : July 31, 2001
INVENTOR(S) : D.B. Cochran

It is certified that error appears in the above-identified patent and that said Letters Patent is hereby corrected as shown below:

<u>Column 4,</u>
Line 61, "increeases" should read -- increases --

Signed and Sealed this

Twenty-sixth Day of February, 2002

Attest:

JAMES E. ROGAN
*Attesting Officer* — *Director of the United States Patent and Trademark Office*